(12) United States Patent
Acree

(10) Patent No.: US 11,878,760 B1
(45) Date of Patent: Jan. 23, 2024

(54) MOTORCYCLE TILT WARNING DEVICE AND RELATED METHODS

(71) Applicant: Joe Acree, Tacoma, WA (US)

(72) Inventor: Joe Acree, Tacoma, WA (US)

( * ) Notice: Subject to any disclaimer, the term of this patent is extended or adjusted under 35 U.S.C. 154(b) by 0 days.

(21) Appl. No.: 18/487,127

(22) Filed: Oct. 16, 2023

(51) Int. Cl.
*B62J 27/00* (2020.01)

(52) U.S. Cl.
CPC .................................. *B62J 27/00* (2013.01)

(58) Field of Classification Search
CPC ........................................................ B62J 27/00
See application file for complete search history.

(56) References Cited

U.S. PATENT DOCUMENTS

| | | |
|---|---|---|
| 3,602,528 A | 8/1971 | Kelly |
| 4,200,168 A | 4/1980 | Moog |
| 4,203,500 A | 5/1980 | Kamiya |
| 4,691,798 A | 9/1987 | Engelbach |
| 5,613,571 A | 3/1997 | Rank et al. |
| 5,765,290 A | 6/1998 | Rank et al. |
| 5,777,290 A | 7/1998 | Tzanev |
| 6,034,594 A | 3/2000 | Gray |
| 6,268,794 B1 | 7/2001 | Tzanev |
| 6,527,077 B2 | 3/2003 | Yamamoto et al. |
| 6,685,208 B1 | 2/2004 | Cowie |
| 7,549,664 B2 | 6/2009 | Bozung et al. |
| 8,480,111 B1* | 7/2013 | Kuo .......................... B62H 1/00 280/293 |
| 10,800,270 B1* | 10/2020 | Kuo ....................... B60L 3/0015 |
| 2004/0251657 A1* | 12/2004 | Kan .......................... B62J 27/30 280/304.3 |
| 2007/0040351 A1 | 2/2007 | Bozung et al. |
| 2015/0183480 A1 | 7/2015 | Ono |
| 2018/0208261 A1* | 7/2018 | Chen ......................... B62H 1/12 |

FOREIGN PATENT DOCUMENTS

| | | | | |
|---|---|---|---|---|
| DE | 102004019525 B4 | 9/2012 | | |
| EP | 1391373 A1 * | 2/2004 | ............. | B62J 27/00 |
| GB | 2366777 A * | 3/2002 | ............. | B62J 27/00 |
| JP | H07132869 A | 5/1995 | | |
| KR | 20190010294 A * | 1/2019 | | |
| WO | WO-0243981 A1 * | 6/2002 | ............. | B62J 27/00 |

* cited by examiner

*Primary Examiner* — Nicole T Verley
(74) *Attorney, Agent, or Firm* — Sierra IP Law, PC; William K Nelson

(57) ABSTRACT

A tilt warning device is operable to alert a two-wheeled vehicle operator of potential dismount or accident. The warning device comprises of a warning rod that is operable to generate sparks when the two-wheeled vehicle undergoes excessive tilt when driving around corners at higher-than-normal speeds. When undergoing excessive tilt, the sparks generated by the warning rod direct the operator to move the two-wheeled vehicle upright from its current orientation.

7 Claims, 5 Drawing Sheets

MOTORCYCLE TILT WARNING DEVICE AND RELATED METHODS

FIELD OF THE INVENTION

The present invention relates generally to a warning device for protecting the driver of a two-wheeled vehicle. More particularly, the present invention provides a mechanical assembly that is operable to alert a two-wheeled driver traveling at high speeds when traversing corners.

BACKGROUND OF THE INVENTION

Motorcycles, or two-wheeled motor vehicles, are less stable than traditional four-wheel vehicles. Riders are susceptible to environmental conditions and face an elevated risk of accidents compared to those driving automobiles. The risks of driving a motorcycle are especially prevalent when navigating corners at higher speeds. For example, motorcycles may present instabilities at higher speeds and may also have limited traction between both wheels due to the small contact patch between the tire and the road. To overcome these risks, a stability control system or warning device may be adapted to the motorcycle. Warning devices may be operable to alert the driver during extreme circumstances of driver dismount or potential motor vehicular accident.

Traditional warning devices on motorcycles may alert the driver using digital sensors with auditory or visible warnings. However, these devices may distract the driver from concentrating on the road and other surroundings. For example, some devices may obstruct the driver's field of view, creating unintended consequences such as vehicle collisions or loss of life. There exists a need for a warning device or stability system that alerts the driver without excessive visual or auditory cues. A device that can alert the driver without impeding the driver's line of vision is in dire need to prevent involuntary driver dismounts and improve overall road safety.

SUMMARY OF THE INVENTION

The present invention provides a warning device incorporated into a motorcycle operable to alert drivers when navigating corners at higher speeds.

In some embodiments, the warning device may include a mechanical assembly with a clamp and threaded rod. The mechanical assembly may also include an additional threaded rod, spring, fastener, and a warning rod. The clamp may be operable to attach to the exhaust pipe of the motorcycle and pivot along its axis whilst being secured to the motorcycle. In some embodiments, the clamp may be placed in a centralized location along the vehicle frame. The centralized location may be located closer to the rear wheel of the motorcycle to improve the accuracy of the warning device. In other embodiments, the clamp may be placed at a different location (e.g., exhaust shaft).

In some embodiments, the threaded rod may pass through the clamp. The rod may be part of a larger mechanical assembly that may include a spring, additional threaded rod, and fastener. The spring may be operable to provide a constant force on the clamp, such that the mechanical assembly is securely attached to the motorcycle. In other embodiments, the spring may be operable to reduce vibrations that may loosen the clamp during motorcycle operation.

In some embodiments, the spring may be selected from the following: compression springs, tension springs, torsion springs, or wave springs. In other embodiments, the spring may be a different variation from those mentioned.

A fastener may attach to the end of the threaded rod, which is thereby connected with a warning rod. The fastener may be operable to join the warning rod with the threaded rod. In some embodiments, the fastener may be a hex bolt, Allen nut, hex nut, or any type of fastener operable to join two components together. In other embodiments, the fastener may be a different variation from those mentioned.

In some embodiments, the warning rod may be located at the distal end of the mechanical assembly, farthest from the motorcycle. In such cases, the warning rod may be secured to the mechanical assembly using a fastener, which is thereby connected through a threaded rod and spring. The mechanical assembly may be connected to an additional threaded rod and clamp securing with the motorcycle at a centralized location along the exhaust shaft.

The mechanical assembly connected to the motorcycle may be operable to alert the driver before a collision occurs. During events of high-speed cornering, motorcycle drivers lean into the turn to counteract the centrifugal forces exhibited by the road. In such cases, the warning rod may be operable to contact with the road surface and generate a sparking effect. The sparking effect may direct the driver to shift the weight of the motorcycle upright from the ground to avoid vehicle collision or driver dismounting. In some embodiments, the warning rod may generate a plurality of sparks when contacting the road surface.

In some embodiments, the road surface may be asphalt, concrete, cobblestone, or gravel. In other embodiments, the road surface may be comprised of an abrasive and hard material.

It is an aspect of the present invention to provide a two-wheeled vehicle tilt warning device, the tilt warning device may include a first rigid member that may be fixedly secured to a two-wheeled vehicle frame, a spring having a distal end fixed to the first rigid member and a proximal end securing a rod carrier; and a rod secured into the rod carrier. The rod may be operable to produce sparks when engaged with a drivable surface and the spring may flex, thereby indicating to a two-wheeled vehicle operator of excessive vehicle tilt. The device may include an adjustment mechanism positioned between the spring proximal end and the rod carrier. The adjustment mechanism may be a threaded fastener secured to the spring proximal end and a threaded nut is operable to fix the rod carrier's position along the threaded fastener's length. The rod carrier may further include a rod lock that is operable to secure the rod. The rod may be removable and replaceable and constructed from a material that is operable to produce sparks when engaged with the drivable surface, the material may be a metallic material. The first rigid member may be fixedly secured to the two-wheeled vehicle frame via a shaft clamp comprising a rigid member receiver that is operable to secure the first rigid member.

It is another aspect of the present invention to provide, a two-wheeled vehicle tilt indicator device, that may include, a rod mount receiver secured to a frame of the two-wheeled vehicle, the rod mount having a threaded aperture; a rigid member having a threaded end and a second end, where the threaded end is secure to the threaded aperture; a compression spring having a distal end coupled to the second end and a proximal end secured to a length adjustment mechanism; and a rod collar that may be fixedly secured to the adjustment mechanism and operable to secure an indicator shaft.

The indicator shaft may be operable to produce a plurality of sparks when engaged with a paved surface, the plurality of sparks are viewable by a vehicle operator, indicating excessive tilt of the two-wheeled vehicle. The rod mount receiver may couple to the vehicle and position the threaded aperture in a substantially perpendicular direction to a vehicle's center line. The rigid member, compression spring, adjustment mechanism, rod collar, and indicator shaft may be substantially in line with each other. The compression spring may be operable to flex when the indicator shaft is engaged with the paved surface and is operable to return the indicator shaft to a starting position when disengaged. The adjustment mechanism may include a threaded shaft having a first end coupled to the compression spring proximal end and a second end securing the rod collar, and the threaded nut may be operable to engage with the threaded shaft and fixes the rod collar in place. The rod collar may include a conduit and a set screw that is operable to receive the indicator shaft, the set screw may be operable to secure the indicator shaft. The rod mount receiver may be a two-piece shaft coupler that may include a rubber cushion that is operable to dampen vibrations from the indicator shaft when engaged with the paved surface.

It is a further aspect of the present invention to provide, a method of indicating excessive tilt of a two-wheeled vehicle to a vehicle operator, the method may include the steps of, securing a shaft collar having a threaded aperture to a vehicle frame; securing a spring-loaded sparking mechanism to the threaded aperture, the mechanism may include, a spring having a distal end securing a threaded member that is operable to secure to the threaded aperture and a proximal end securing a length adjustment mechanism, and a rod collar secured to the length adjustment mechanism on one end and a shaft indicator secured to a second end; and adjusting an angle of the shaft collar with respect to a center plane of the vehicle. When the two-wheeled vehicle is in a turn with excessive tilt and the shaft indicator engages with the ground and produces a plurality of sparks that are viewable by the operator, indicating excessive vehicle tilt. The adjusting an angle of the shaft collar with respect to a center plane of the vehicle may be adjusted to an angle, positioning the spring-loaded sparking mechanism in a position that provides optimal spark to the operator. The length adjustment mechanism may be adjusted to a length that allows optimal sparking distance between the shaft indicator and the ground surface when the two-wheeled vehicle is tilted at a predefined angle. The system may include a step of calibrating the length adjustment mechanism to allow for variable sparking distances in accordance with different types of ground surfaces. Calibration of the length may be achieved through a telescoping structure incorporated into the length adjustment mechanism, operable to adjust the length of the mechanism in incremental steps. The indicator shaft may be removable and replaced after excessive spark and damage to the indicator shaft.

Further aspects and embodiments will be apparent to those having skill in the art from the description and disclosure provided herein.

It is an object of the present invention to improve overall road safety during motorcycle operation.

It is an object of the present invention to reduce driver distractions during high-speed turns.

It is an object of the present invention to improve motorcycle driver safety when navigating high-speed turns.

It is an object of the present invention to provide a spring-loaded sparking mechanism, that is operable to position a sparking element in engagement with the ground when a two-wheeled vehicle is undergoing excessive tilt. The sparking element producing a plurality of sparks, thereby indicating excessive tilt to the vehicle operator.

The above-described objects, advantages, and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Figure 1:
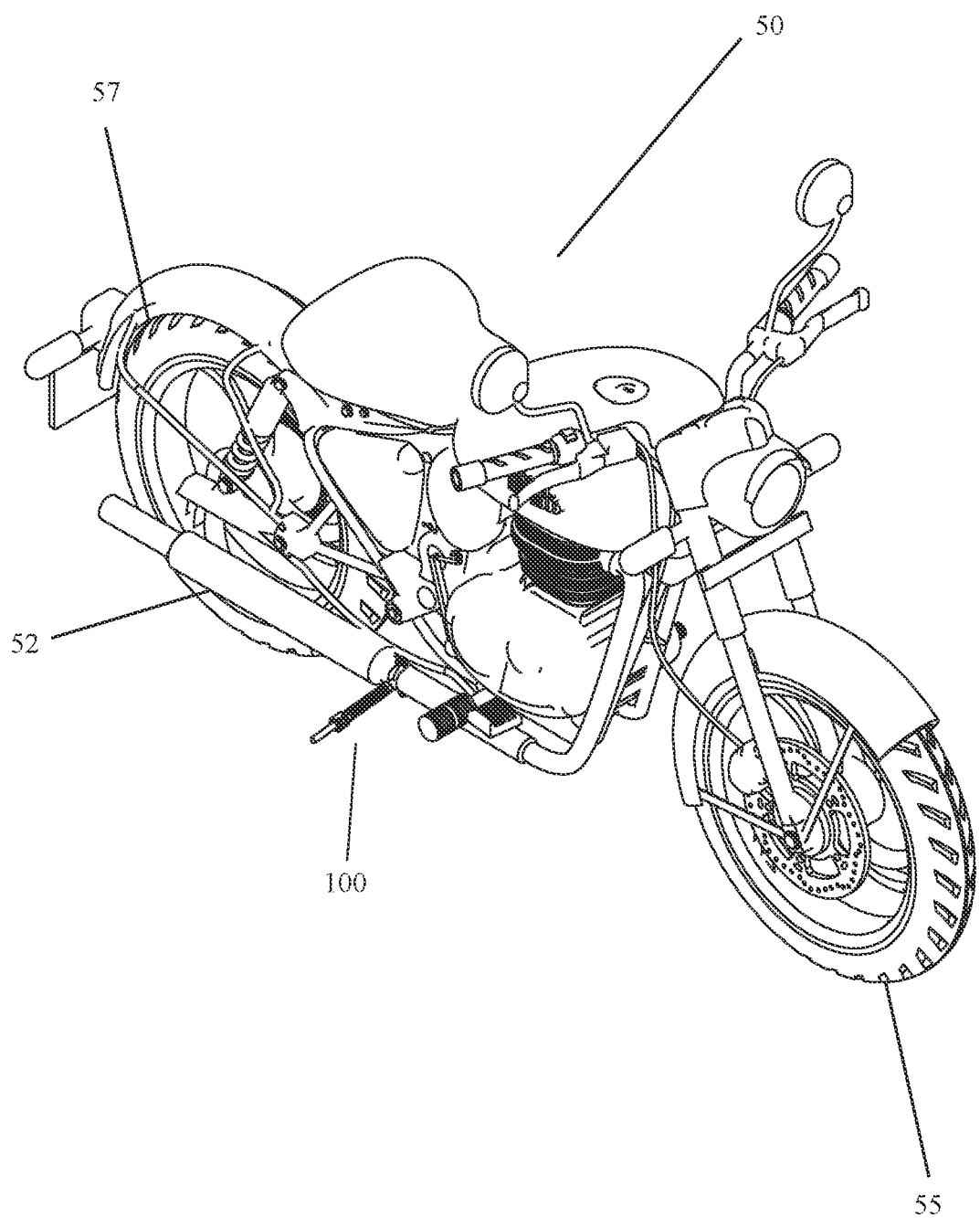
FIG. 1 provides an environmental perspective view of the warning device, according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Referring to the drawings, wherein like reference characters designate like or corresponding parts throughout the several views, and referring particularly to FIGS. 1-5, it is seen that the present invention includes various embodiments of a tilt warning device that is operably incorporated into a motorcycle.

The present invention describes a tilt warning device incorporated into a motorcycle. In some embodiments, the motorcycle warning device 100 may be rotatably coupled to a motorcycle 50 between front wheel 55 and rear wheel 52 on exhaust shaft 52, as shown in FIG. 1. In other embodiments, the tilt warning device 100 may be coupled to a location other than the exhaust shaft 52 such that it is centered between front wheel 55 and rear wheel 52.

In some embodiments, the exhaust shaft 52 of the motorcycle may comprise of headers, mid-pipes, and mufflers. In other embodiments, the exhaust shaft 52 may be consistent with other configurations.

In some embodiments, the motorcycle may be selected from the following configurations: cruiser, sport bike, touring, standard, adventure, electric, or chopper. In other embodiments, the motorcycle may be any two-wheeled vehicle that is used for on-road applications.

The primary application of the tilt warning device 100 is to create a sparking effect when engaged with the road pavement. If a motorcycle 50 is used for off-road applications, the sparking effect may not perform its intended application, readily alerting the driver of potential dismounting when tilt is detected.

Figure 2:
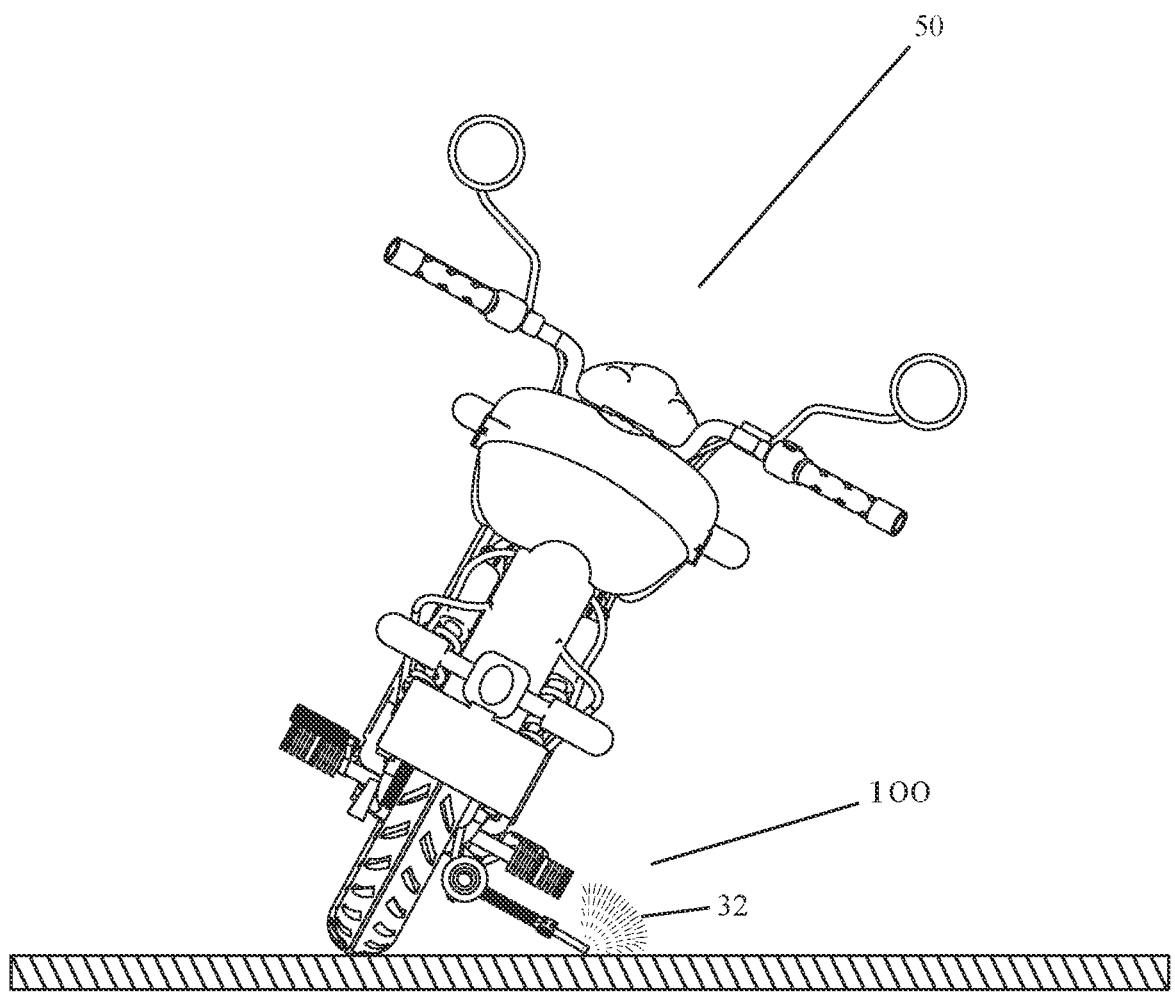
FIG. 2 provides an environmental front view of the warning device, according to an embodiment of the present invention.

The warning rod 30 of tilt warning device 100 may come into contact with the ground when the motorcycle 50 is leaning towards the surface, as shown in FIG. 2. In some embodiments, the tilt warning device 100 may create a sparking effect alerting the driver to laterally shift the motorcycle 50 upwards from the surface to avert driver injury.

In some embodiments, the sparking effect arises when the warning rod 30 contacts with the road pavement. Sparking occurs due to the rapid generation and discharge of heat that occurs when two materials come into close frictional contact. In other embodiments, the sparking effect may be a result of high electrical conductivity, material properties, or surface irregularities present within the warning rod 30.

Figure 3:
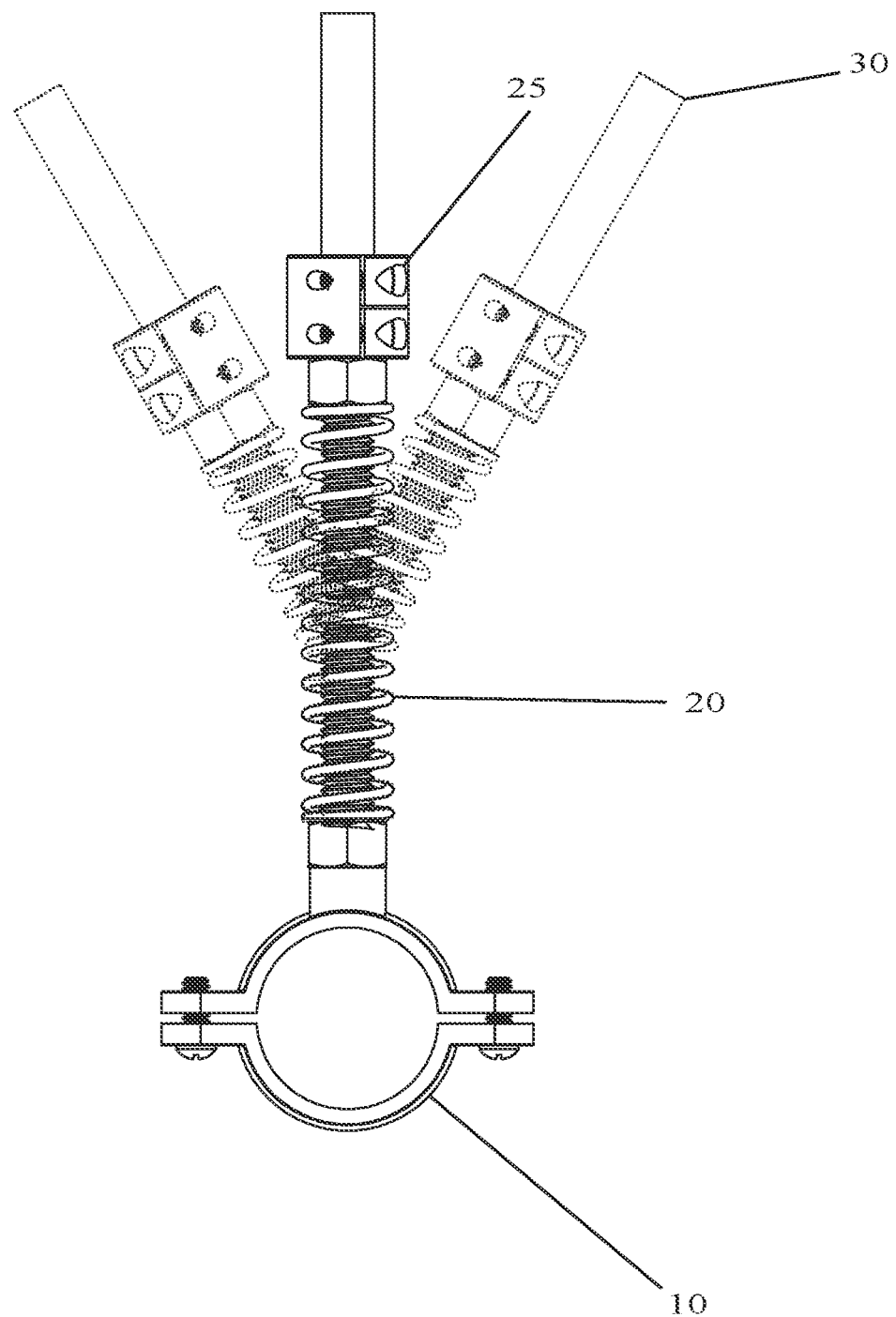
FIG. 3 provides a front view of the warning device, according to an embodiment of the present invention.

In some embodiments, the tilt warning device 100 may include a clamp 10 (e.g., first rigid member, rod mount), spring 20, threaded rod 22a/22b (e.g. adjustment mechanism), fastener 25 (e.g., rod carrier), and warning rod 30 (e.g., indicator shaft), as shown in FIG. 3. The range of motion of the tilt warning device may vary depending on the motorcycle's location with respect to the ground surface. In some embodiments, the driver may be upright whilst maintaining a vertical posture with the motorcycle. In other embodiments, the driver may shift their body weight by leaning left or right, causing the motorcycle to lean towards the ground surface. Motorcycle drivers may lean left or right whilst turning to overcome the centrifugal forces directed from the road surface.

When the motorcycle is upright with respect to the ground surface, the tilt warning device 100 and warning rod 30 may be oriented parallel to the ground surface. In other embodiments, the tilt warning device may tilt by following the angle of the motorcycle 50. By following the angle of the motorcycle 50, warning rod 30 may contact with the road surface generating sparks 32.

In some embodiments, there may be a single spark generated by the warning rod 30 when contacting with the pavement of the road surface. In other embodiments, there may be a plurality of sparks 32 generated by the warning rod when contacting with the road surface. The number of sparks 32 generated may be directly correlated with the motorcycle's angle with respect to the ground and the motorcycle's speed. For example, if the driver maintains an angle between 15 to 45 degrees and is driving between 30 to 50 miles per hour, the warning rod 30 may contact the road surface, generating a single spark or a plurality of sparks 32. In other embodiments, the warning rod 30 may generate a single spark or a plurality of sparks 32 if the angle and speed vary from those mentioned.

The warning rod 30 may be comprised of ferrous/non-ferrous metals or a particular alloy. In other embodiments, the warning rod 30 may be comprised of other materials with high carbon content, reactive nature, high electrical conductivity, low ignition point, or a susceptibility to frictional heat.

Spring 20 may be operable to dampen vibrations from the tilt warning device during contact between warning rod 30 and the ground surface. When the warning rod 30 contacts the road surface, the spring 20 may compress. In other embodiments, the spring 20 may return to its original position along the tilt warning device 100. In some embodiments, the spring 20 may act as a fail-safe mechanism in case of component failure during motorcycle operation.

Figure 4:
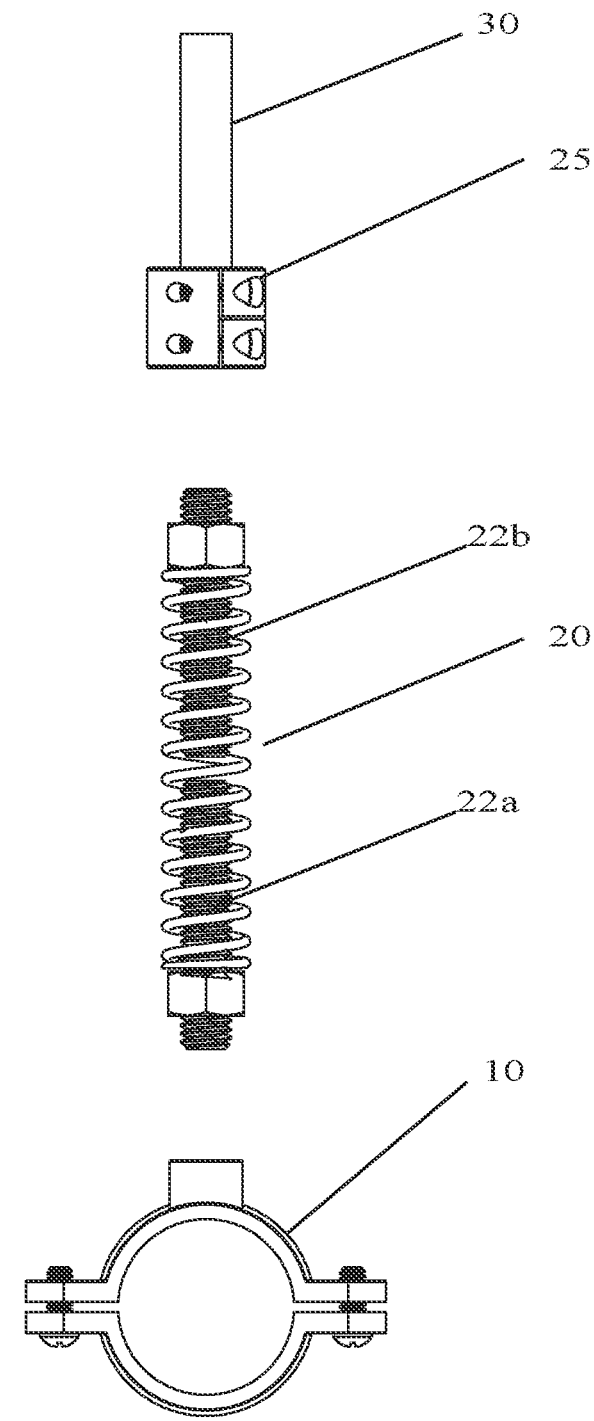
FIG. 4 provides an exploded front view of the warning device, according to an embodiment of the present invention.

The tilt warning device 100 includes a clamp 10, spring 20, threaded rods 22a and 22b, fastener 25, and warning rod 30, as shown in FIG. 4. Threaded rods 22a and 22b may be embedded inside spring 20 to connect the clamp 10 and fastener 25 of tilt warning device 100. The warning rod 30 may be placed at the distal end of the tilt warning device. In some embodiments, the clamp 10 may be a C-clamp with a threaded screw. In other embodiments, clamp 10 may be a hose clamp, quick-grip clamp, pipe clamp, or other similar clamps.

Figure 5:
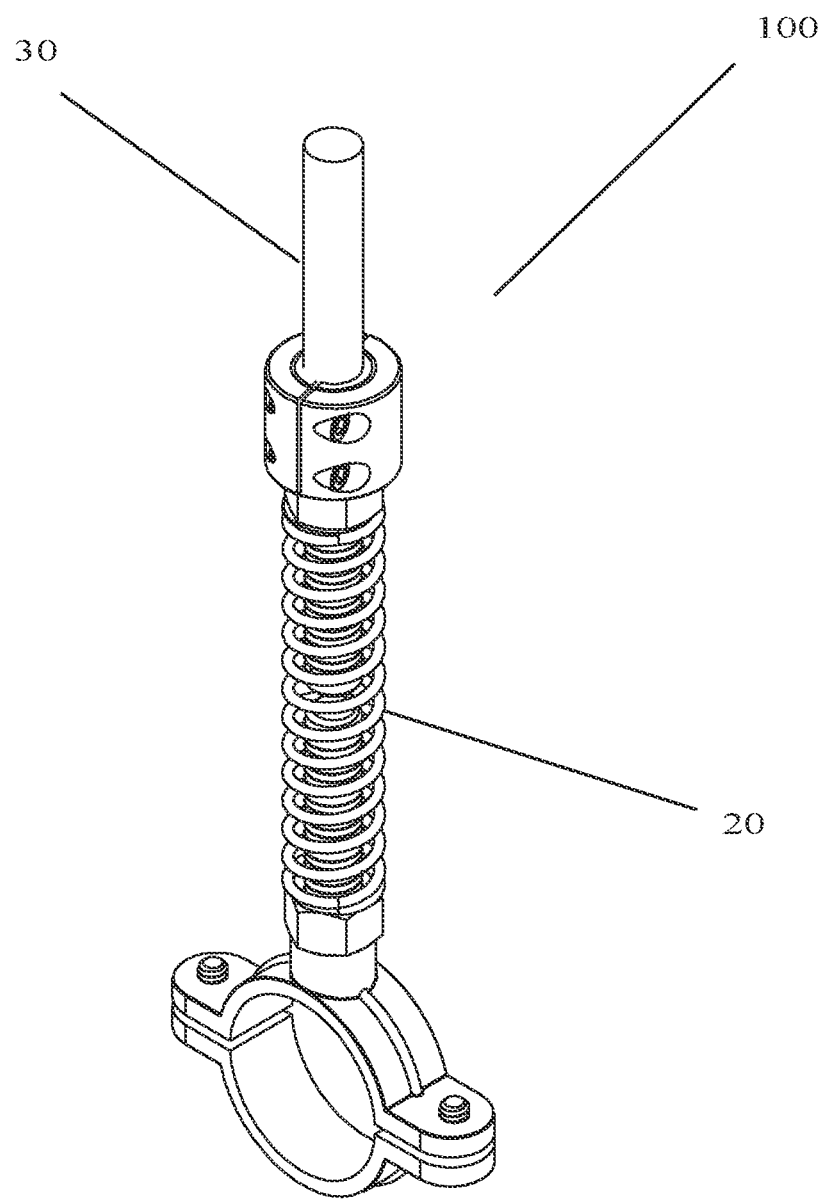
FIG. 5 provides a perspective view of the warning device, according to an embodiment of the present invention.

In some embodiments, the tilt warning device 100 may comprise of a warning rod 30 that may spark when in contact with the pavement of a road surface, as shown in FIG. 5. However, the sparking effect is most prevalent when the motorcycle 50 is driving at higher speeds when navigating corners. In such cases, the driver may be prompted to take immediate action when visualizing or hearing sparks 32 flying from the warning rod 30. Higher speeds can be between the range of 30 to 50 miles per hour. In other embodiments, higher speeds can mean between 15 to 30 miles per hour.

Immediate action from the driver may include slowing down or varying the lean angle between the motorcycle 50 and the road surface. The driver may shift the motorcycle 50 upright from either left or right directions to prevent the driver from dismounting.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A two-wheeled vehicle tilt indicator device, the device comprising:
   a. a rod mount receiver secured to a frame of said two-wheeled vehicle, said rod mount receiver has a threaded aperture;
   b. a rigid member having a threaded end and a second end, wherein said threaded end is secure to said threaded aperture;
   c. a compression spring having a distal end coupled to said second end and a proximal end secured to a length adjustment mechanism; and
   d. a rod collar fixedly secured to said adjustment mechanism and operable to secure an indicator shaft,
      wherein said indicator shaft is operable to produce a plurality of sparks when engaged with a paved surface, said plurality of sparks are viewable by a vehicle operator, indicating excessive tilt of said two-wheeled vehicle.

2. The device of claim 1, wherein said rod mount receiver couples to said vehicle and positions said threaded aperture in a substantially perpendicular direction to a vehicle's center line.

3. The device of claim 2, wherein said rigid member, compression spring, adjustment mechanism, rod collar, and indicator shaft are substantially in line with each other.

4. The device of claim 3, wherein said compression spring is operable to flex when said indicator shaft is engaged with said paved surface and is operable to return said indicator shaft to a starting position when disengaged.

5. The device of claim 3, wherein said adjustment mechanism comprises a threaded shaft having a first end coupled to said compression spring proximal end and a second end securing said rod collar, wherein a threaded nut is operable to engage with said threaded shaft and fixes said rod collar in place.

6. The device of claim 5, wherein said rod collar includes a conduit and a set screw that is operable to receive said indicator shaft, wherein said set screw is operable to secure said indicator shaft.

7. The device of claim 2, wherein said rod mount receiver is a two piece shaft coupler and includes a rubber cushion that is operable to dampen vibrations from said indicator shaft when engaged with said paved surface.

\* \* \* \* \*